(12) United States Patent
Narain et al.

(10) Patent No.: US 9,967,141 B2
(45) Date of Patent: May 8, 2018

(54) SYSTEMS AND METHODS OF IN-BAND NETWORK CONFIGURATION

(71) Applicant: Vencore Labs, Inc., Basking Ridge, NJ (US)

(72) Inventors: Sanjai Narain, Basking Ridge, NJ (US); Samuel Gordon, Basking Ridge, NJ (US)

(73) Assignee: Vencore Labs, Inc., Basking Ridege, NJ (US)

( * ) Notice: Subject to any disclaimer, the term of this patent is extended or adjusted under 35 U.S.C. 154(b) by 127 days.

(21) Appl. No.: 15/199,242

(22) Filed: Jun. 30, 2016

(65) Prior Publication Data

US 2017/0005862 A1    Jan. 5, 2017

Related U.S. Application Data

(60) Provisional application No. 62/188,359, filed on Jul. 2, 2015.

(51) Int. Cl.
*H04L 12/24*    (2006.01)

(52) U.S. Cl.
CPC .......... *H04L 41/0813* (2013.01); *H04L 41/12* (2013.01)

(58) Field of Classification Search
CPC .......... H04L 41/12; H04L 45/00; H04L 45/50
See application file for complete search history.

(56) References Cited

U.S. PATENT DOCUMENTS

| 6,754,176 | B1 * | 6/2004 | Gubbi | H04L 12/462 370/230 |
| 6,865,609 | B1 * | 3/2005 | Gubbi | H04L 29/06 370/349 |
| 6,934,752 | B1 * | 8/2005 | Gubbi | H04L 29/06027 370/392 |
| 7,804,280 | B2 * | 9/2010 | Deaver, Sr. | H02J 3/1828 323/210 |
| 9,525,466 | B2 * | 12/2016 | Yum | H04J 11/00 |
| 2015/0296540 | A1 * | 10/2015 | Yum | H04B 7/024 370/329 |
| 2016/0219024 | A1 * | 7/2016 | Verzun | H04L 63/102 |

* cited by examiner

*Primary Examiner* — Ranodhi Serrao
(74) *Attorney, Agent, or Firm* — Heslin, Rothenberg, Farley & Mesiti P.C.

(57) ABSTRACT

In a method, computer system, and computer program product include for re-configuring a network, program code identifies relationships between nodes on a network, where each relationship of the relationships includes a first node running a routing protocol and a second node running the routing protocol, where the first node and the second node are physically connected, and where the nodes include at least one controller and a plurality of routers. The program code performs, starting at the at least one controller a reverse breadth search of the relationships to determine for each router, a number of relationships comprising a path from the controller to the router. The program code, for example, program code that is executed on the at least one controller, reconfigures the routers in descending order of magnitude of the number of relationships comprising the path from each router of the plurality of routers to the controller.

17 Claims, 11 Drawing Sheets

300

310

One or more programs identify relationships between nodes (at least one controller and routers) on a network wherein each relationship includes a first node running a routing protocol and a second node running the routing protocol, where the first node and the second node are physically connected, and where the first node and the second node run interfaces that sit on a given subnet.

320

One or more programs start at the controller and perform a breadth search of the relationships to determine for each router how many relationships comprise a path from the controller to the router.

330

One or more programs reconfigure the routers in descending order of number of relationships comprising the path from each router to the controller.

FIG. 3

SYSTEMS AND METHODS OF IN-BAND NETWORK CONFIGURATION

CROSS-REFERENCE TO RELATED APPLICATIONS

This application claims priority to U.S. Provisional Application No. 62/188,359 filed Jul. 2, 2015, entitled, "SYSTEMS AND METHODS OF IN-BAND NETWORK CONFIGURATION" which is incorporated herein by reference in its entirety.

STATEMENT REGARDING FEDERALLY SPONSORED RESEARCH OR DEVELOPMENT

This invention was made with government support under contract number FA8750-13-C-0030 awarded by the U.S. Air Force Research Laboratory of U.S. Department of Defense. The government has certain rights in the invention.

FIELD OF INVENTION

The Invention relates generally to systems and methods of in-band configuration of a network, including, in-band configuration via dynamic routing and a reverse breadth-first search.

BACKGROUND OF INVENTION

Current methods of reconfiguring data networks often include sending the configuration updates over an out-of-band network. However, an out-of-band network increases both capital expenditures (CAPEX) such as expenditures incurred when a business spends money either to buy fixed assets or to add to the value of an existing fixed asset with a useful life extending beyond the taxable year, and operating expenditure (OPEX), the cost of developing or providing non-consumable parts for the product or system. Reconfiguration without an out-of-band network may be particularly desirable in a distributed network model, for example, in a Distributed Assured and Dynamic Configuration (DADC) model.

SUMMARY OF INVENTION

Shortcomings of the prior art are also overcome and additional advantages are provided through the provision of a method for re-configuring a network in-band. The method includes: identifying, by one or more processors, relationships between nodes on a network, wherein each relationship of the relationships includes a first node running a routing protocol and a second node running the routing protocol, wherein the first node and the second node are physically connected, and wherein the nodes comprise at least one controller and a plurality of routers; performing, by the one or more processors, starting at the at least one controller a reverse breadth search of the relationships to determine for each router of the plurality of routers a number of relationships comprising a path from the controller to the router; and reconfiguring, by the one or more processors, the routers in descending order of magnitude of the number of relationships comprising the path from each router of the plurality of routers to the controller.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

FIG. 3 is a workflow that illustrates aspects of an embodiment of the present invention.

DETAILED DESCRIPTION OF THE INVENTION

Figure 1:
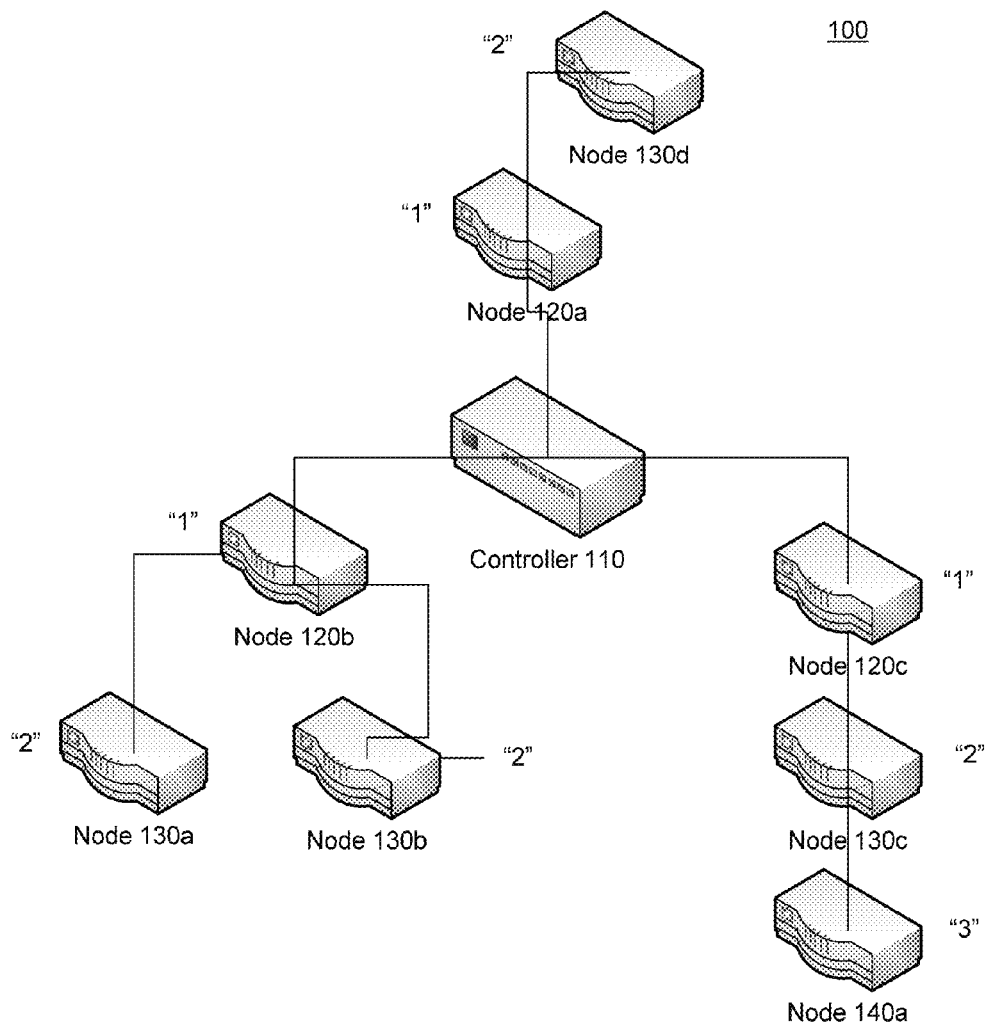
FIG. 1 depicts a technical architecture that demonstrates aspects of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application. Program code may refer to one or more programs.

A common way of reconfiguring a data network is to send configuration updates over an out-of-band network. However, an out-of-band network increases both CAPEX and OPEX. The present invention includes at least two methods for eliminating the requirement of an out-of-band network in order to reconfigure an existing network. Instead, both systems and methods utilize methods of reconfiguring a given network in-band. A need for such a network that can be reconfigured in-band, i.e., without relying upon sending configuration updates over an out-of-band network. This type of system and method may include using the data network itself to carry updates. Once challenge to utilizing the data in a given network to carry configuration updates is that if the updates are done in the wrong order, components can be disconnected before they are updated.

Certain embodiments of the present invention compute a correct order by using the properties of a dynamic routing protocol and reverse breadth-first search of the network connectivity graph. For ease of understanding, systems and methods described herein that utilize this type of approach are referred to as methods and systems of in-band configuration via dynamic routing and reverse breadth-first search.

Methods and systems of in-band configuration via dynamic routing and reverse breadth-first search are practiced by embodiments of the present invention that eliminate the need for the out-of-band network by implementing program code executed by at least one processor to identify network assumptions to make in-band configuration feasible and to validate that these assumptions can be met in realistic networks. Embodiments of the present invention order reconfiguration operations so that those network elements farthest from the controller are re-configured first. Once a node on the network is reconfigured, it can no longer be accessed by nodes that have not be re-configured. Thus, by reconfiguring the nodes that are the farthest away first, and progressively working inward, during reconfiguration, connectivity to the nodes that still need to be reconfigured can be maintained and post-configuration, communications will be restored. Embodiments of the present method may rely on the property of routing protocols (including but not limited to, open shortest path first (OSPF)) that will find a path in a network whenever such a path exists.

In an embodiment of the present invention, program code executed by at least one processor identifies nodes on a given network. The identification of the nodes can be understood, in one example, by constructing a graph of the network, as seen in FIG. 1. FIG. 1 is a graph 100 that represents a network that may be reconfigured utilizing an embodiment of the present invention. For ease of understanding, many of the figures, including FIG. 1, are illustrated as networks that include a single, centralized, controller. However, many shared and distributed networks utilize more than one controller and each of these controllers can utilize aspects of the present method to configure a region of the computing environment.

Embodiments of the present invention include a method for re-configuring a network, in-band. As part of this method, in an embodiment of the present invention, program code identifies relationships between nodes on a network, where each relationship of the relationships includes a first node running a routing protocol and a second node running the routing protocol, where the first node and the second node are physically connected, and where the nodes include at least one controller and a plurality of routers. The program code performs, starting at the at least one controller a reverse breadth search of the relationships to determine for each router of the plurality of routers a number of relationships comprising a path from the controller to the router. The program code, for example, program code that is executed on the at least one controller, reconfigures the routers in descending order of magnitude of the number of relationships comprising the path from each router of the plurality of routers to the controller. In an embodiment of the present invention, the first node and the second node run interfaces that sit on a given subnet.

In an embodiment of the present invention, the program code also generates a network graph representing the number of relationships comprising the path from the controller to each router of the plurality of routers, where an edge represents each relationship. The program code utilizes the network graph, during the reconfiguring, to establish the descending order for the reconfiguration of the nodes.

In an embodiment of the present invention, when the program code identifies the relationships, it does do by extracting data related to the at least one controller and the plurality of routers from at least one system file and utilizing the data in the generating of the network graph. The data may include at least one of: a router name, an interface IP address, or a network mask. The system files may include a Distributed Assured and Dynamic Configuration (DADC) solution file.

In an embodiment of the present invention, the program code maintains, during the reconfiguring, network connectivity of the nodes to the routers of the plurality of routers yet to be reconfigured.

Referring to FIG. 1, one of skill in the art will comprehend that the network graph 100 is a representation to allow for better understanding of aspects of the present method. In this example, every node in the graph represents a router in the network, and an edge is drawn between two routers if and only if they are physically connected and running the same routing protocol on interfaces that sit on the same subnet. An edge is not drawn between two routers that have an IP tunnel. (As will be discussed later, an IP tunnel can be used as an alternate route to a given node to reconfigure this node.) In this example, an edge indicates that the two adjacent routers could conceivably route through that edge, though at any given time they may not be using that edge. Using this graph, one may perform a breadth first search, starting at the controller 110. The identification of the nodes can be further exemplified by labelling the neighbors of a controller 120a-120c are labeled with the number "1," their neighbors 130a-130d with the number "2," and so forth (node 140a is labeled "3") until every node is labeled. The present system and method may be utilized to reconfigure the routers in decreasing order of their labels, with ties broken arbitrarily.

Figure 2:
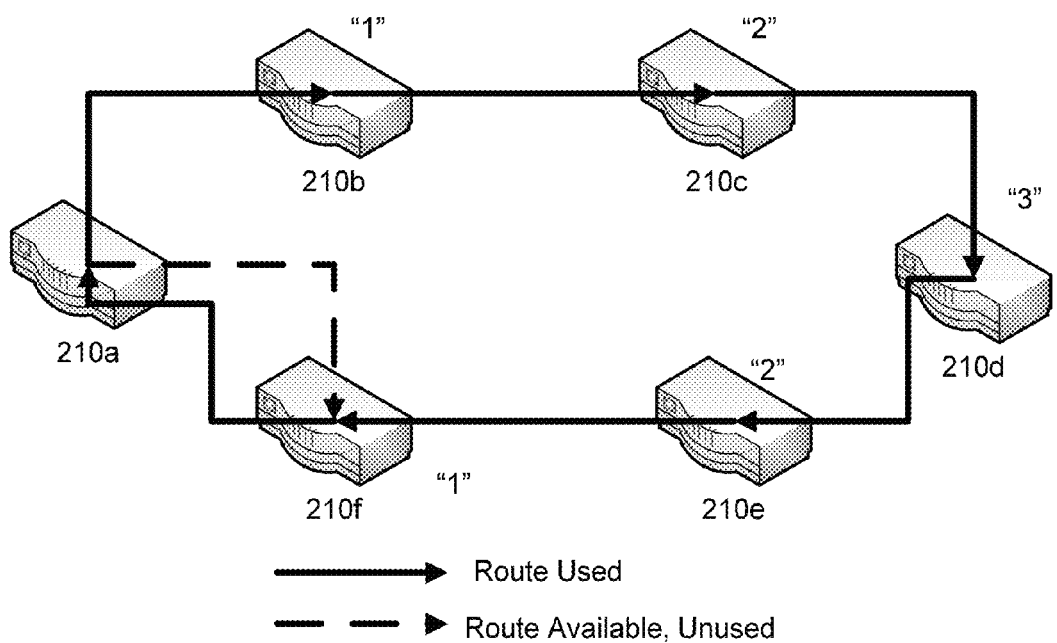
FIG. 2 depicts a technical architecture that demonstrates aspects of an embodiment of the present invention.

FIG. 2 demonstrates aspects of the present invention that demonstrate how dynamic routing and reverse breadth-first search enable in-band reconfiguration of a given network. FIG. 2 represents a sample network 200 for reconfiguration. FIG. 2 illustrates that there is a difference between routs taken by communications through the nodes of a network, generally, and the routes that are actually available between nodes in the network. As seen in FIG. 2, communications on a network may utilize certain routes between nodes, in this case, a regularly utilized route exists between node 210a and node 210b. Also, in order for data from node 210a to reach node 210f, generally the data is routed from node 210a, through node 210b, through node 210c, through node 210d, and through node 210e, to reach node 210f. However, there exists a route, though it is not utilized, from node a directly to node 210f. It is the latter type of route that the program code identifies and utilizes to reconfigure the network 200 in accordance with aspects of the present invention. As demonstrated in FIG. 2, given a node with label i and another with label j>i, there exists at least one route from the controller to the node with label i that does not go through the node with label j.

In the network graph 200 of FIG. 2, the network includes controller 210a and a group of nodes/routers 210b-f. In this example, although the network currently routes to node 210f by going around the full circle (perhaps because of external cost factors), there exists a direct path to node 210f that could be used instead. In an embodiment of the present invention, program code executing on a processor identifies the relationships and connections between nodes in the network. As explained in reference to FIG. 1, in FIG. 2, the connections between the nodes 210b-f and the controller 210a are represented by numbers. In this example, routers 210b and 210f are labeled "1," routers 210c and 210e are labeled "2," and router 210d is labeled "3." Thus, in an embodiment of the present invention, the program code will execute configuration instructions backwards, reconfiguring 210d, followed by 210c and 210e and lastly 210b and 210f. Note that the route currently used to reach 210f will be cut when 210d is reconfigured. However, at that point the routing protocol will detect this fact and re-route traffic to 210f through the edge (210a, 210f). This example also serves to explain why we assume there are no static routes in the network. If there were a static route from 210a to 210f' that passed through all other nodes, then, after cutting this route by re-configuring 210d, the routing protocol will not re-route traffic and 210f will become un-reachable. The examples below further explain methods employed by various embodiments of the present invention.

FIG. 3 is a workflow 300 of an embodiment of the present invention to reconfigure nodes on a network, as illustrated in FIGS. 1-2, among others. In this example, the nodes of the network may be routers that are reconfigured by a controller in an order that mitigates connectivity losses on the network during the reconfiguration process. In an embodiment of the present invention, program code identifies relationships between nodes on a network wherein each relationship includes a first node running a routing protocol and a second node running the routing protocol, where the first node and the second node are physically connected, and where the first node and the second node run interfaces that sit on a given subnet (310). In an embodiment of the present invention, the nodes include routers and at least one controller. The program code starts at the controller and performs a breadth search of the relationships to determine for each router how many relationships comprise a path from the controller to the router (320). The program code reconfigures the routers in descending order of number of relationships comprising the path from each router to the controller (330).

As illustrated in the overview provided in FIG. 3, in an embodiment of the present invention, if n may represent the number of routers in the network, excluding the controller. As illustrated by FIGS. 1-3, the program code identifies relationships and connectivity to a given controller, which can be represented by constructing a graph with n+1 nodes, labeled $x_0, x_1, \ldots, x_n$ where $x_0$ is the controller. The program code can add an edge $(x_i, x_j)$ if and only if routers i and j are physically connected, have two interfaces on the same subnet, and engage each other in a routing protocol. In an embodiment of the present invention, the routing protocol can re-direct traffic through this edge if and when it becomes necessary. In an embodiment of a network in which an embodiment of the present invention is implemented, reconfiguring router i cannot remove any edges between router j and k if k≠i≠j. In a network upon which an embodiment of the present invention is implemented, at the start of the method, for i>0, there is a path from $x_0$ to $x_i$ (i.e., at the start of the protocol every router can be reached from the controller.) We use $\Gamma(x_i)$ to denote the neighbors of node $x_i$ in the resulting graph. Example 1 below illustrates aspects of the present method.

---

Let $S_0 = \{x_0\}$. For $i \in \{1,\ldots,n\}$, let $S_i = \emptyset$.
For i = 1,...,n:
    For $x_j \in S_i - 1$:
        For $x_k \in \Gamma(x_j)$:
            If $x_k \notin (S_0 \cup S_1 \cup \ldots \cup S_{i-1})$, set $S_i = \{x_k\} \cup S_i$.
        If $|S_1 \cup \ldots \cup S_i)| = n$, break.
For i = n,...,1:
    Reconfigure the routers corresponding to the nodes in $S_i$.

---

Example 1

In an embodiment of the present technique, a node x depends on node y if all paths from $x_0$ to x go through node y and x depends on set S if every path from $x_0$ to x contains some y∈S. Thus, for every i∈{1, . . . , n}, for every x∈$S_1$, there exists a path of length i from $x_0$ to x. This concept is true for nodes in $S_1$, since the embodiment described of present methods only place neighbors of $x_0$ in this set. For every node x∈$S_i$, it follows from the protocol description that x is the neighbor of some y∈$S_{i-1}$. By the inductive hypothesis, there is a path of length i-1 from $x_0$ to y. It follows that there is a path of length i from $x_0$ to x.

Additionally, in an embodiment of the present invention, for every i∈{1, . . . , n}, for every x∈$S_i$, the length of the shortest path from $x_0$ to x is i. If x∈$S_i$, then for any j≠i it holds that x∉$S_j$ (i.e., each element belongs to only one set). Suppose that for some x∈$S_i$ the shortest path from $x_0$ to x is of length j<i. As understood by one of skill in the art, if one chooses any path of length j from $x_0$ to x, and denotes it by $(x_0, y_1, \ldots y_{j-1}, y_1)$, where $y_1$ is a neighbor of $x_0$, $y_i$ is a neighbor of $y_{i-1}$ and $y_j$=x. Thus, for k∈{1, . . . , j}, $y_k \in S_k$. By induction: certainly $y_1 \in S_1$ since $y_1 \in \Gamma(x_0)$ and all neighbors of $x_0$ are placed in $S_1$ in the first iteration of the protocol.

In an embodiment of the present method, $y_{k-1} \in S_{k-1}$, and $y_k \in S_k$. One can demonstrate that if $y_k \in S_l$ then 1≤k. This holds because $y_{k-1} \in S_{k-1}$, and $y_k \in \Gamma(y_{k-1})$, so if $y_k \notin S_1 \cup \ldots \cup S_{k-1}$, it will be placed in $S_k$ at the start of the kth iteration. On the other hand, on can show that if $y_k \in S_l$ then l≥k. Suppose l<k, then, there is a path from $x_0$ to $y_k$ of length l<k. It would follow that there is a path from $x_0$ to x of length l+(j-k)<j, which violates the assumption that the shortest path from $x_0$ to x is of length j but proves that x∈$S_j$. Now, since j<i, and since each element can only be in one set, this violates the assumption that x∈$S_i$. One can therefore conclude that there is no such path of length j.

In accordance with an embodiment of the present invention, for any i∈{1, . . . , n}, there is no x∈$S_i$ that depends on $S_{i+1} \cup \ldots \cup S_n$. As explained earlier, for every y∈$S_{i+1} \cup \ldots \cup S_n$, the shortest path from $x_0$ to y has length greater than i, while for every x∈$S_i$ the shortest path is of length i. If x depends on $S_{i+1} \cup \ldots \cup S_n$, then every path from $x_0$ to x includes some node in $S_{i+1} \cup \ldots \cup S_n$, forcing it to have length at least i+1. Thus, x does not depend on $S_{i+1} \cup \ldots \cup S_n$.

However, in accordance with certain aspects of the present invention, for every i∈{1, . . . , n}, just before node $x_i$ is reconfigured, there exists a path from $x_0$ to $x_i$. This relies on the assumption that reconfiguring node $x_i$ does not remove any edges between $x_j$ and $x_k$ if $j \neq i \neq k$.

Figure 4:
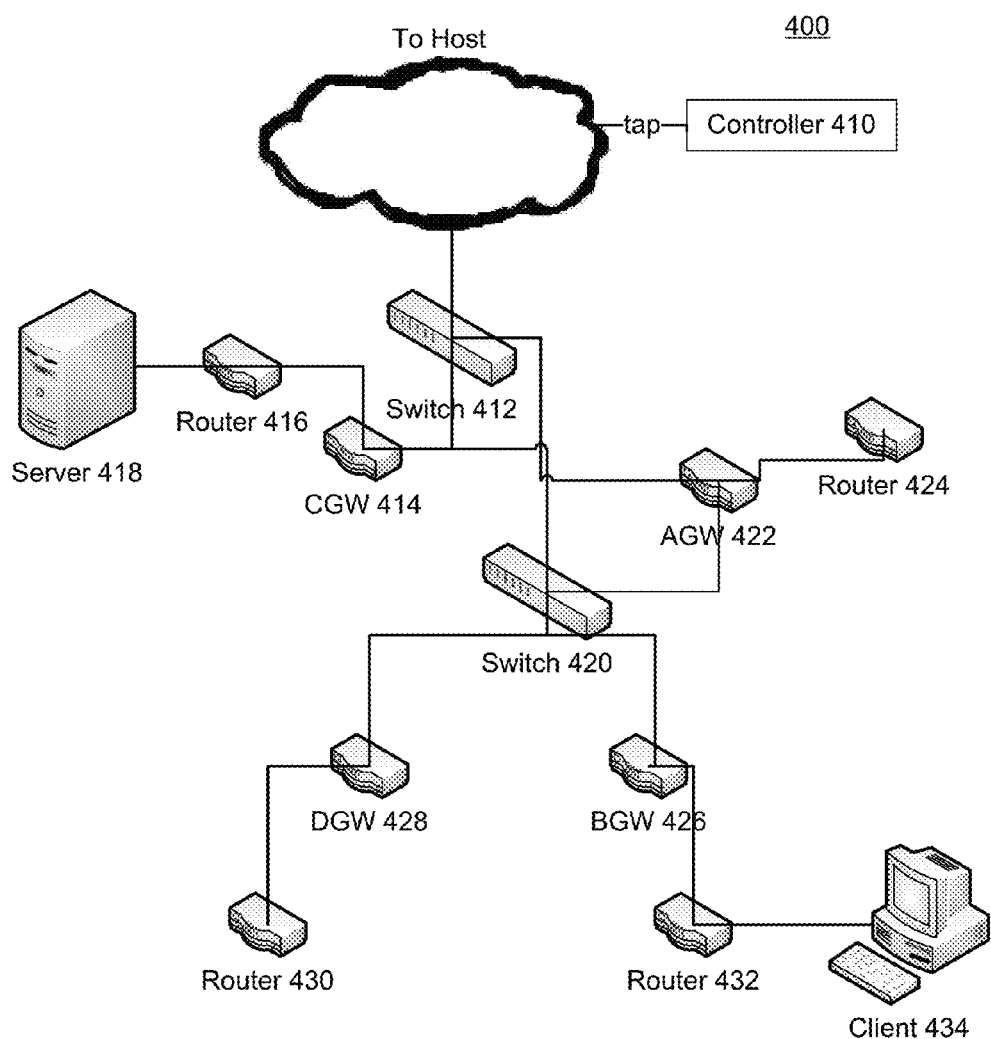
FIG. 4 is an example of a network upon which an embodiment of the present invention related to in-band configuration via dynamic routing and reverse breadth-first search may be implemented.

FIG. 4 is an example of a network 400 upon which an embodiment of the present invention related to in-band configuration via dynamic routing and reverse breadth-first search may be implemented. As seen in FIG. 4, merely one example of a network upon which an embodiment of the present invention may be implemented, the network 400 includes ten (10) nodes (routers, switches, and/or gateways), a controller, a client, and a server. Elements of these exemplary network include controller 410, switches 412, 410, server 418, routers 416, 424, 430 and 432, client 434, and gateways 414, 422, 425, 428, which include a default gateway (a first router in the network path), a border gateway, and a customer/client gateway. These network elements are utilized again in FIGS. 9-10.

In an embodiment of the present invention, program code executing on at least one processor identifies the nodes on the network 400, for example, by generating a network graph, as discussed above. In the network graph generated by the program code, a node will represent each router and there is an edge connecting two nodes if the corresponding routers have a common subnet between them. In an embodiment of the present invention, the program code may generate the graph by extracting router names, interface IP addresses and network masks from various system files, including but not limited to a Distributed Assured and Dynamic Configuration (DADC) solution file. DADC represents a network prototype that overcomes the centralization and out-of-band control network limitations of Assured and Dynamic Configuration (ADC), and is resilient to compromise and failure of the cyber infrastructure. DADC provides intelligent response to intrusions and optimized reconfiguration and leverages a group communication infrastructure with strong virtual synchrony guarantees to provide ordered message communication.

Figure 5:
FIG. 5 is an example of a portion of a DADC solution file that may be utilized by the program in an embodiment of the present invention to create a network graph.

FIG. 5 is an example of the program code may utilize a portion of a DADC solution file that may be utilized by the program in an embodiment of the present invention to create a network graph. The network includes various gateways, as well as certain routers and switches.

Figure 6:
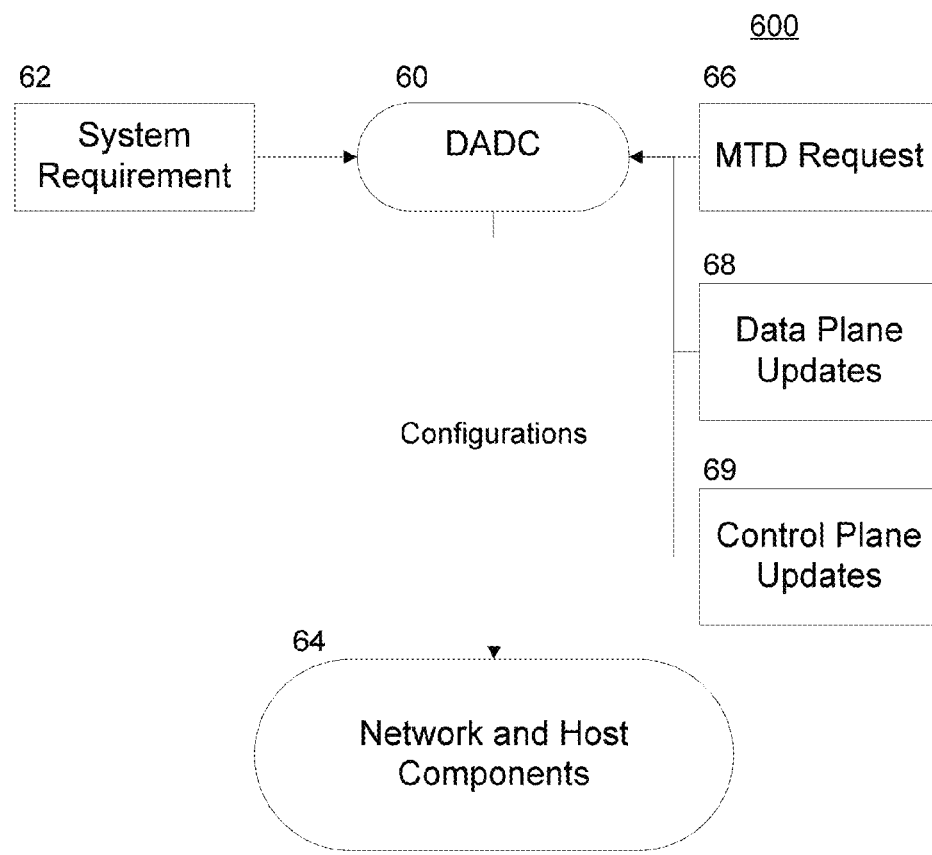
FIG. 6 is an illustration of portions of a DADC environments into which aspects of an embodiment of the present invention may be implemented.

For illustrative purposes, FIG. 6 is an example of a top-level architecture of a DADC system. As seen in in FIG. 6, DADC controller 60 accepts as an input a System Requirement 62, which captures the security and functionality constraints of network components. The DADC controller 60 then reconfigures the network, including the Network and Host Components 64 to satisfy the Requirement 62. This reconfiguration may occur in response to a number of different events, including but not limited to: 1) moving target defense triggers, shown as a Moving Target Defense Request 66, requiring reconfiguration as a defensive mechanism; 2) updates to the dynamic state of dataplane 68 and 3) updates to the dynamic state of control plane components 69 (i.e., DADC controllers).

Figures 7, 8:
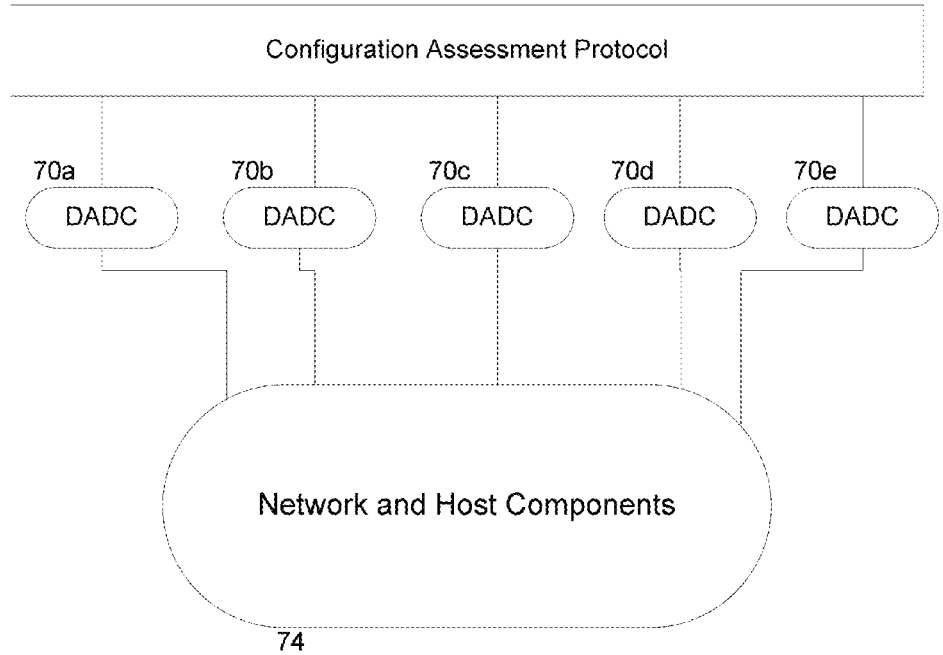
FIG. 7 is an illustration of portions of a DADC environments into which aspects of an embodiment of the present invention may be implemented.
FIG. 8 is an example of an output of program in an embodiment of the present invention.

Because a particular network architecture may not include centralized controlled by a single controller, as seen in FIG. 7, the Network and Host Components 74 (e.g., FIG. 6, 64) may be partitioned into enclaves that are each controlled by one or more DADC controller 70a-70e. Thus, aspects of embodiments of the present invention may be utilized to guarantee that messages (e.g., new configurations) are delivered to controllers in the same order and that the controllers reconfigure the components in their enclaves in the aforementioned reverse order to that the connectivity of the overall network is maintained as much as possible during reconfiguration.

Returning to the network illustrated in FIG. 4, the network graph created by the program code is done in this example utilizing a DADC solution file (e.g., FIG. 5). However, various system files can be utilized to realize an existing network configuration and understand the paths utilized from a controller to various routers. Various protocols can be utilized by the program code to traipse the network and analyze the connections between the various components in order to formulate a configuration order, as demonstrated in FIG. 3.

Referring to FIG. 5, a DADC solution file that can be utilized by an embodiment of the present invention, the program code utilizes the file to establish the connections between nodes in order to identify relationships between nodes on a network where each relationship includes a first node and second node running the same routing protocol, where the first node and the second node are physically connected, and where the first node and the second node run interfaces that sit on a the same subnet. In order to represent these relationships, the program code may generate a network graph, in this example, the network graph shown of FIG. 9. A network graph is a representation of the paths determined by aspects of embodiments of the present invention between nodes in order to determine the configuration order.

Figure 9:
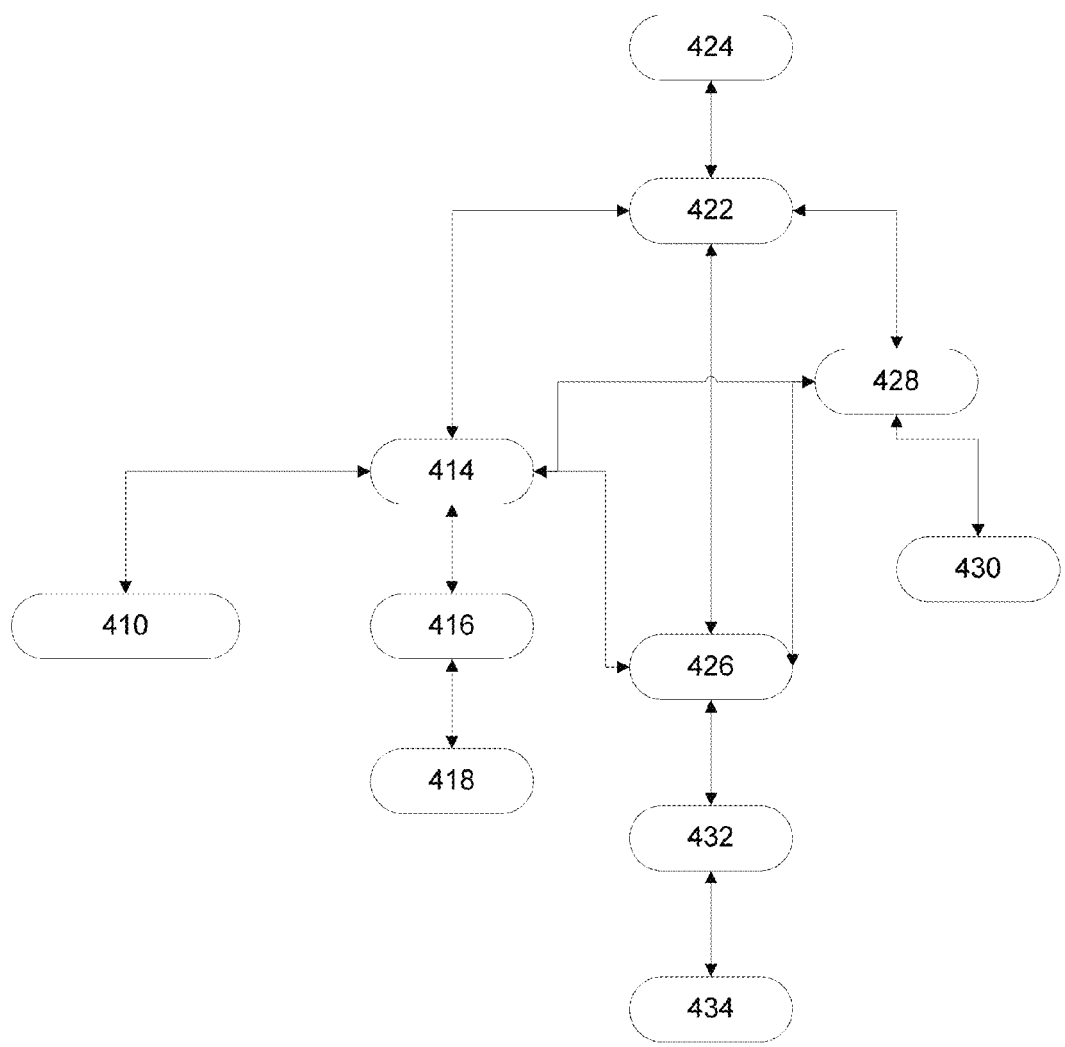
FIG. 9 is a network graph illustrating aspects of a method that is an embodiment of the present invention.
Figure 10:
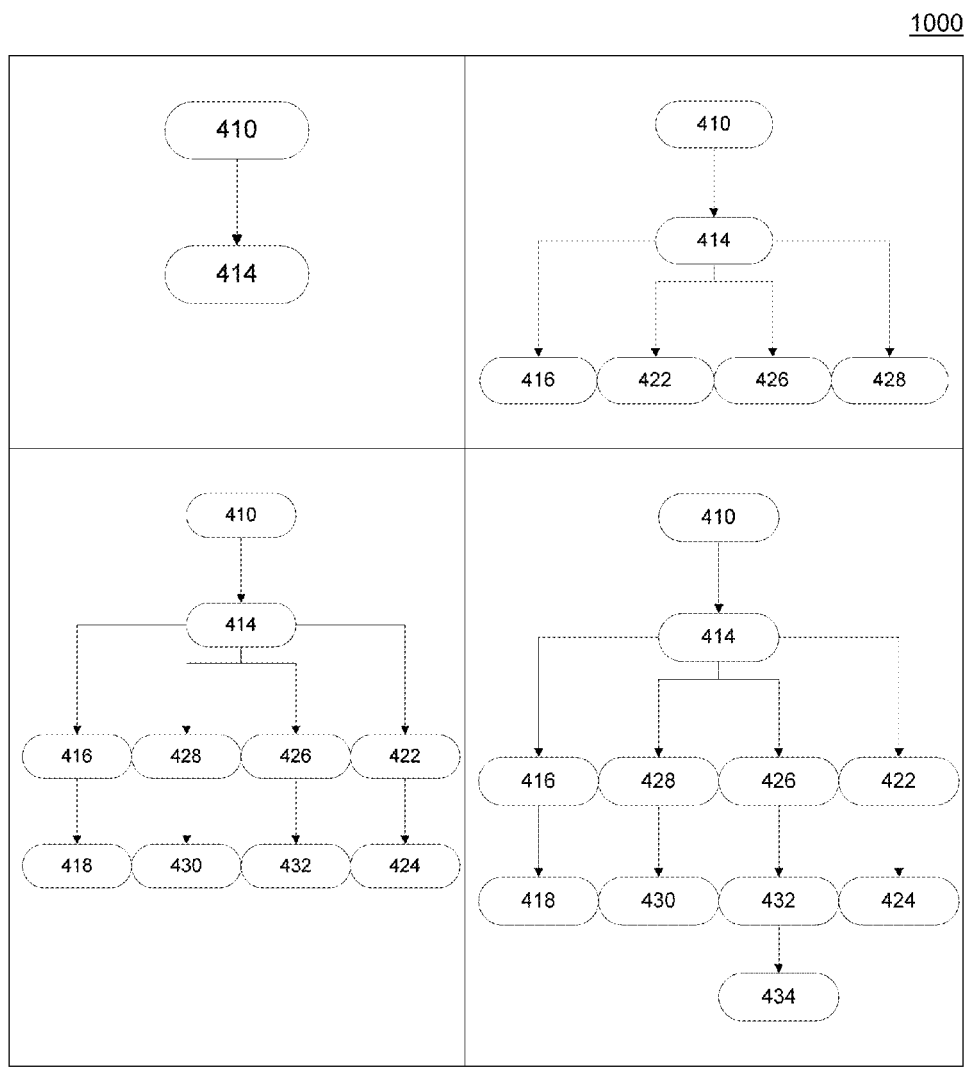
FIG. 10 depicts aspects of an embodiment of the present invention, namely breadth-first traversal and tree formation by program code.

FIGS. 9-10 represent network graphs of FIG. 4. These graphs are a visual representing a results of the program code identifying relationships between physically connected nodes running the same protocol and running interfaces that sit on a given subnet (e.g., FIG. 3, 310). Referring to FIG. 9, gateways 414, 422, 425, and 428 are shown as directly connected to each other because they all share a common subnet using a hub. In an embodiment of the present invention, the program code traverses the tree representation of the network 400 (FIG. 4), as depicted in network graph 900 (FIG. 9).

FIG. 10 depicts breadth-first traversal and tree formation by the program code. From standpoint of the program code, non-visited child nodes obtained by expanding a node are added to a FIFO queue. FIG. 10 also includes the same elements as the network 400 of FIG. 4. The program code runs in a loop until the queue is empty. The root (starting) node is the controller. Example 2 is pseudo code representing aspects of an embodiment of the method.

```
1       procedure BFS(Graph,source):
2           create a queue Q
3           enqueue source onto Q
4           mark source
5           while Q is not empty:
6               dequeue an item from Q into v
7               for each edge e incident on v in Graph:
8                   let w be the other end of e
9                   if w is not marked:
10                      mark w
11                      enqueue w onto Q
```

Example 2

In an embodiment of the present invention, the program code generates a configuration order. Utilizing the described example, the program code may output a resultant configuration order as results similar to those in FIG. 8. The results, as seen in FIG. 8, provide an order in which routers can be reconfigured from the controller without affecting the reachability to any of the yet-to-be-reconfigured routers. On each line, there is a group of routers, each represented as a combination of a node name, an interface name and IP an address, which can be reconfigured in any order. To maintain network operability, all routers on each line must be reconfigured before any routers on the next line are reconfigured.

Figure 11:
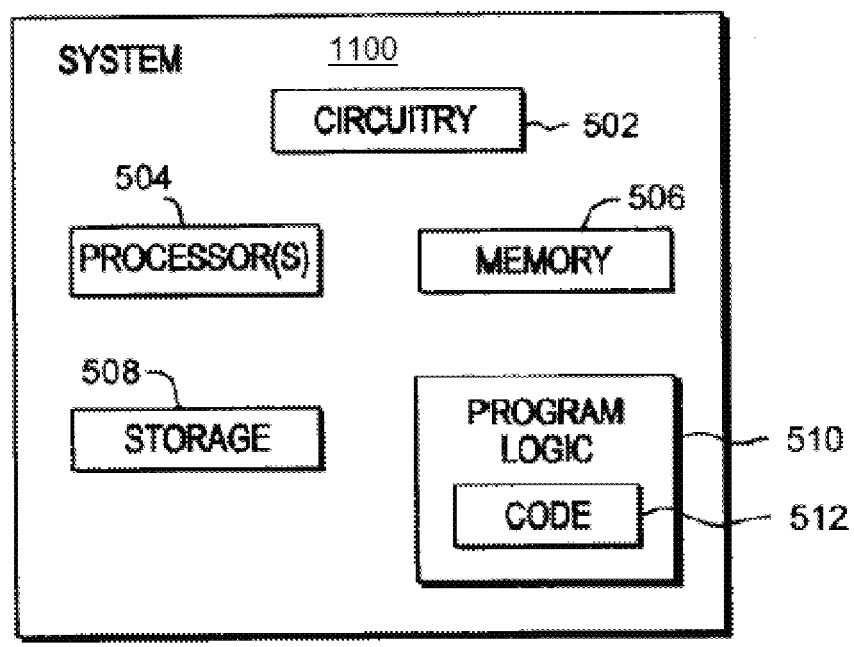
FIG. 11 depicts a computer system configured to perform an aspect of an embodiment of the present invention.
Figure 12:
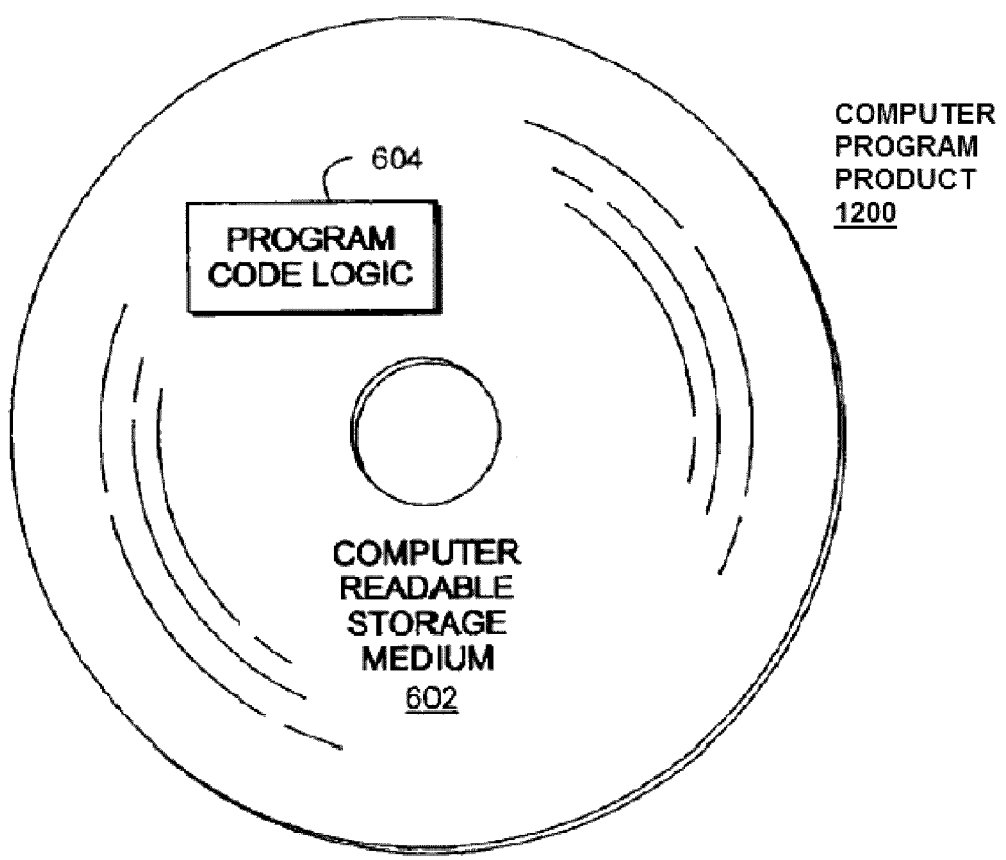
FIG. 12 depicts a computer program product incorporating one or more aspects of the present invention.

FIG. 11 and FIG. 12 are relevant to both types of in-band systems and methods discussed in this disclosure. FIG. 11 illustrates a block diagram of a resource 1100 in computer system, such as controller 110, or router 120b, which is part of the technical architecture of certain embodiments of the technique. Returning to FIG. 11, the resource 1100 may include a circuitry 502 that may in certain embodiments include a microprocessor 504. The computer system 1100 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 1100 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 11 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Using the processing resources of a resource 1100 to execute software, computer-readable code or instructions, does not limit where this code can be stored. Referring to FIG. 12, in one example, a computer program product 1200 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A method re-configuring a network in-band comprising:
    identifying, by one or more processors, relationships between nodes on a network, wherein each relationship of the relationships includes a first node running a routing protocol and a second node running the routing protocol, wherein the first node and the second node are physically connected, and wherein the nodes comprise at least one controller and a plurality of routers;
    performing, by the one or more processors, starting at the at least one controller a reverse breadth search of the relationships to determine for each router of the plurality of routers a number of relationships comprising a path from the controller to the router;
    reconfiguring, by the one or more processors, the routers in descending order of magnitude of the number of relationships comprising the path from each router of the plurality of routers to the controller;
    generating, by the one or more processors, a network graph representing the number of relationships comprising the path from the controller to each router of the plurality of routers, wherein an edge represents each relationship; and
    utilizing by the one or more processors the network graph during the reconfiguring to establish the descending order.

2. The method of claim 1, wherein the first node and the second node run interfaces that sit on a given subnet.

3. The method of claim 1, wherein the identifying comprises:
    extracting, by the one or more processors, data related to the at least one controller and a the plurality of routers from at least one system file; and
    utilizing, by the one or more processor, the data in the generating of the network graph.

4. The method of claim 3, wherein the data comprises at least one of: a router name, an interface IP address, or a network mask.

5. The method of claim 4, wherein the at least one system file comprises a Distributed Assured and Dynamic Configuration (DADC) solution file.

6. The method of claim 1, wherein the reconfiguring further comprises:
    maintaining, by the one or more processors, during the reconfiguring, network connectivity of the nodes to the routers of the plurality of routers yet to be reconfigured.

7. A computer program product comprising:
    a non-transitory computer readable storage medium readable by one or more processors and storing instructions for execution by the one or more processors for performing a method comprising:
        identifying, by the one or more processors, relationships between nodes on a network, wherein each relationship of the relationships includes a first node running a routing protocol and a second node running the routing protocol, wherein the first node and the second node are physically connected, and wherein the nodes comprise at least one controller and a plurality of routers;
        performing, by the one or more processors, starting at the at least one controller a reverse breadth search of the relationships to determine for each router of the plurality of routers a number of relationships comprising a path from the controller to the router;
        reconfiguring, by the one or more processors, the routers in descending order of magnitude of the number of relationships comprising the path from each router of the plurality of routers to the controller;
        generating, by the one or more processors, a network graph representing the number of relationships comprising the path from the controller to each router of the plurality of routers, wherein an edge represents each relationship; and
        utilizing, by the one or more processors, the network graph, during the reconfiguring, to establish the descending order.

8. The computer program product of claim 7, wherein the first node and the second node run interfaces that sit on a given subnet.

9. The computer program product of claim 7, wherein the identifying comprises:
    extracting, by the one or more processors, data related to the at least one controller and a the plurality of routers from at least one system file; and
    utilizing, by the one or more processor, the data in the generating of the network graph.

10. The computer program product of claim 9, wherein the data comprises at least one of: a router name, an interface IP address, or a network mask.

11. The computer program product of claim 10, wherein the at least one system file comprises a Distributed Assured and Dynamic Configuration (DADC) solution file.

12. The computer program product of claim 7, wherein the reconfiguring further comprises:
    maintaining, by the one or more processors, during the reconfiguring, network connectivity of the nodes to the routers of the plurality of routers yet to be reconfigured.

13. A system comprising:
    a memory;
    one or more processors in communication with the memory; and
    program instructions executable by the one or more processors via the memory to perform a method, the method comprising:
        identifying, by the one or more processors, relationships between nodes on a network, wherein each relationship of the relationships includes a first node running a routing protocol and a second node running the routing protocol, wherein the first node and the second node are physically connected, and wherein the nodes comprise at least one controller and a plurality of routers;
        performing, by the one or more processors, starting at the at least one controller a reverse breadth search of the relationships to determine for each router of the plurality of routers a number of relationships comprising a path from the controller to the router;
        reconfiguring, by the one or more processors, the routers in descending order of magnitude of the number of relationships comprising the path from each router of the plurality of routers to the controller;

generating, by the one or more processors, a network graph representing the number of relationships comprising the path from the controller to each router of the plurality of routers, wherein an edge represents each relationship; and utilizing, by the one or more processors, the network graph, during the reconfiguring, to establish the descending order.

14. The system of claim 13, wherein the first node and the second node run interfaces that sit on a given subnet.

15. The system of claim 13, wherein the identifying comprises:

extracting, by the one or more processors, data related to the at least one controller and a the plurality of routers from at least one system file; and utilizing, by the one or more processor, the data in the generating of the network graph.

16. The system of claim 15, wherein the data comprises at least one of: a router name, an interface IP address, or a network mask.

17. The system of claim 16, wherein the at least one system file comprises a Distributed Assured and Dynamic Configuration (DADC) solution file.

* * * * *